United States Patent
Ashkenazi et al.

(10) Patent No.: US 11,599,648 B1
(45) Date of Patent: Mar. 7, 2023

(54) SYNCHRONIZING PRIVATE DATA WITH REDUCED TRUST

(71) Applicant: Switchboard Visual Technologies, Inc., San Jose, CA (US)

(72) Inventors: Amir Ashkenazi, Los Altos, CA (US); Chris Jones, San Bruno, CA (US); Neil Rotstan, Winthrop, WA (US); Peter Ciporin, San Francisco, CA (US)

(73) Assignee: Switchboard Visual Technologies, Inc., San Jose, CA (US)

( * ) Notice: Subject to any disclaimer, the term of this patent is extended or adjusted under 35 U.S.C. 154(b) by 0 days.

(21) Appl. No.: 17/897,513

(22) Filed: Aug. 29, 2022

Related U.S. Application Data

(63) Continuation of application No. 17/751,989, filed on May 24, 2022, now Pat. No. 11,461,480.

(51) Int. Cl.
| | |
|---|---|
| *G06F 21/60* | (2013.01) |
| *H04L 9/08* | (2006.01) |
| *H04L 9/32* | (2006.01) |
| *G06F 21/62* | (2013.01) |
| *G06F 21/53* | (2013.01) |

(52) U.S. Cl.
CPC ............ *G06F 21/602* (2013.01); *G06F 21/53* (2013.01); *G06F 21/6218* (2013.01); *H04L 9/0819* (2013.01); *H04L 9/3213* (2013.01)

(58) Field of Classification Search
None
See application file for complete search history.

(56) References Cited

U.S. PATENT DOCUMENTS

| | | | |
|---|---|---|---|
| 6,950,852 B1 | 9/2005 | Kobayaghi et al. |
| 8,245,141 B1 | 8/2012 | Fuller et al. |
| 8,291,334 B1 | 10/2012 | Castellanos et al. |
| 8,316,089 B2 | 11/2012 | Thakkar et al. |
| 8,346,868 B2 | 1/2013 | Nakajima |
| 8,473,851 B2 | 6/2013 | DeGrazia |
| 8,749,610 B1 | 6/2014 | Gossweiler et al. |
| 9,483,752 B1 | 11/2016 | Raju et al. |
| 9,575,712 B2 | 2/2017 | Farouki |

(Continued)

OTHER PUBLICATIONS

App No. PCT/US2021/35594 International Search Report and Written Opinion of the International Searching Authority, dated Sep. 15, 2021.

*Primary Examiner* — Brandon Hoffman
(74) *Attorney, Agent, or Firm* — Weiss & Arons LLP

(57) ABSTRACT

System and methods for synchronizing and encrypting profile information are provided. A method establishes a first browser instance on a first virtual machine being in communication with a first browser profile sync and encrypt agent. The method also establishes a second browser instance on a second virtual machine. The method may use the first browser profile sync and encrypt agent acting through a profile helper service to encrypt profile changes involving the first browser instance on an encrypted master profile and use the second browser profile sync and encrypt agent acting through the profile helper service to encrypt profile changes involving the second browser instance on the encrypted master profile. The method maintains a browser profile persistence for the first browser instance and for the second browser instance, using the encrypted master profile, on a single on-disk profile.

15 Claims, 8 Drawing Sheets

(56) References Cited

U.S. PATENT DOCUMENTS

| | | |
|---|---|---|
| 9,749,367 B1 | 8/2017 | Kirby et al. |
| 9,800,627 B2 | 10/2017 | Sun |
| 9,858,032 B2 | 1/2018 | Kim |
| 10,091,260 B2 | 10/2018 | Sanso et al. |
| 10,129,335 B2 | 11/2018 | Mabey et al. |
| 10,291,597 B2 | 5/2019 | Li et al. |
| 10,326,807 B2 | 6/2019 | Mohan et al. |
| 10,452,769 B1 | 10/2019 | Benavidez et al. |
| 10,476,885 B2 | 11/2019 | Lang et al. |
| 10,484,189 B2 | 11/2019 | Albrecht |
| 10,701,082 B2 | 6/2020 | Lang et al. |
| 10,733,005 B1 | 8/2020 | Zelenov et al. |
| 10,782,844 B2 | 9/2020 | Farouki |
| 10,805,375 B2 | 10/2020 | Cho et al. |
| 10,893,081 B2 | 1/2021 | Lo et al. |
| 10,908,896 B2 | 2/2021 | Lang et al. |
| 11,032,090 B2 | 6/2021 | Archer et al. |
| 11,069,006 B2 | 7/2021 | Colafranceschi et al. |
| 11,093,046 B2 | 8/2021 | Hassan |
| 11,157,241 B2 | 10/2021 | Kenkre et al. |
| 11,188,349 B2 | 11/2021 | Thigpen et al. |
| 2002/0111996 A1 | 8/2002 | Jones et al. |
| 2003/0014513 A1 | 1/2003 | Ruths et al. |
| 2003/0101235 A1 | 5/2003 | Zhang |
| 2004/0181579 A1 | 9/2004 | Huck et al. |
| 2004/0181796 A1 | 9/2004 | Fedotov et al. |
| 2005/0108033 A1 | 5/2005 | Everett-Church |
| 2006/0136441 A1 | 6/2006 | Fujisaki |
| 2007/0296643 A1 | 12/2007 | Ben-Shachar et al. |
| 2009/0164581 A1 | 6/2009 | Bove et al. |
| 2010/0192071 A1 | 6/2010 | Noguchi |
| 2010/0192107 A1 | 7/2010 | Takahashi |
| 2011/0055329 A1 | 3/2011 | Abt, Jr. et al. |
| 2011/0249024 A1 | 10/2011 | Arrasvuori et al. |
| 2012/0054355 A1 | 3/2012 | Arrasvuori et al. |
| 2012/0110088 A1 | 5/2012 | Su et al. |
| 2012/0231441 A1 | 9/2012 | Parthasarathy et al. |
| 2012/0262533 A1 | 10/2012 | Gannu et al. |
| 2013/0007290 A1 | 1/2013 | Yang |
| 2013/0091440 A1 | 4/2013 | Kotler et al. |
| 2013/0144950 A1 | 6/2013 | Sanakaranarasimhan et al. |
| 2013/0215116 A1 | 8/2013 | Siddique et al. |
| 2013/0268872 A1 | 10/2013 | Yin et al. |
| 2014/0282013 A1 | 9/2014 | Amijee |
| 2014/0365580 A1 | 12/2014 | Azenkot et al. |
| 2015/0026257 A1 | 1/2015 | Balakrishnan et al. |
| 2015/0135214 A1 | 5/2015 | Reisman |
| 2016/0080437 A1 | 3/2016 | Haggar et al. |
| 2016/0246787 A1 | 8/2016 | Zhang |
| 2016/0259522 A1 | 9/2016 | Gonzalez et al. |
| 2016/0314509 A1 | 10/2016 | Renshaw et al. |
| 2017/0024100 A1 | 1/2017 | Pieper et al. |
| 2017/0041296 A1 | 2/2017 | Ford et al. |
| 2017/0078449 A1 | 3/2017 | Pavlov et al. |
| 2017/0277696 A1 | 9/2017 | Sekharan |
| 2018/0062852 A1 | 3/2018 | Schmahmann |
| 2018/0260369 A1 | 9/2018 | Meyer et al. |
| 2018/0302233 A1 | 10/2018 | Viera et al. |
| 2018/0343134 A1 | 11/2018 | Press et al. |
| 2019/0004693 A1 | 1/2019 | Faulkner |
| 2019/0087438 A1 | 3/2019 | Nelbach, Jr. et al. |
| 2019/0207929 A1* | 7/2019 | Koorapati ......... G06F 16/24552 |
| 2019/0238599 A1 | 8/2019 | Ingale et al. |
| 2019/0286290 A1 | 9/2019 | Banerjee et al. |
| 2019/0361580 A1 | 11/2019 | Dowling et al. |
| 2019/0391858 A1 | 12/2019 | Studnicka |
| 2020/0058279 A1 | 2/2020 | Garrison |
| 2020/0106813 A1 | 4/2020 | Vendrow et al. |
| 2020/0134572 A1 | 4/2020 | Dhara et al. |
| 2020/0218492 A1 | 7/2020 | Farivar et al. |
| 2020/0296147 A1 | 9/2020 | Eliason et al. |
| 2020/0396278 A1 | 12/2020 | Miller et al. |
| 2021/0056077 A1 | 2/2021 | Sapru et al. |
| 2021/0117050 A1 | 4/2021 | Lewbel et al. |
| 2021/0135895 A1 | 5/2021 | Cheung |

* cited by examiner

SYNCHRONIZING PRIVATE DATA WITH REDUCED TRUST

CROSS REFERENCE TO RELATED APPLICATION

This application is a continuation of U.S. patent application Ser. No. 17/751,989, entitled "SYNCHRONIZING PRIVATE DATA WITH REDUCED TRUST", filed May 24, 2022, which is hereby incorporated by reference herein in its entirety.

FIELD OF TECHNOLOGY

Aspects of the disclosure relate to shared electronic workspaces.

BACKGROUND OF THE DISCLOSURE

A scenario according to the embodiments is contemplated in which a user u makes use of a service such as a web service S. In order for S to serve u, S must be provisioned with data d that is private and sensitive to u.

In certain circumstances, while u is using S, the set of sensitive data d may change: data may be added, removed, and modified. In fact, many modifications of d may occur over its lifetime.

There may be numerous concurrent sessions of u and S, each of which requires the same consistent and up-to-date set of data d.

The user u does not trust S to persist d in between active sessions. In other words, S must be ephemeral with respect to u and d. For the purposes of this application, ephemeral, as it relates to data, should be understood to include types of information that change rapidly over time and may be lost if not collected immediately (e.g., within hours, days or weeks).

The probability of an individual session between a given user u and S becoming compromised is low but nonzero.

The local computing device that u uses to access S is also not fully trusted. A threat model representing a user u accessing S may include the danger of a possible compromise of d on u's local device.

In view of the foregoing, it would be desirable to synchronize private data in a manner that increases trust that the private data will not be compromised.

SUMMARY OF THE DISCLOSURE

A method for synchronizing private data with reduced trust is provided. The method may include receiving an initiation, from a user workstation, of a new session at a web service server. In response to the initiation, the method may include allocating a session identifier to the new session and preparing a plurality of encryption keys and one or more tokens for a user. Thereafter, the method may include returning the session identifier and the one or more tokens to the user workstation and connecting the user workstation to a new session.

The method may then include receiving, at the web service server, protected data from the user workstation. The receiving may occur during the new session, and the protected data may include a plurality of data changes.

The method may unprotect the protected data using the plurality of encryption keys and propose to commit the plurality of data changes as a new changeset.

The method may include receiving confirmation of a successful acceptance of the proposal to commit the data changes as a new changeset and may further include transmitting the changeset to the user workstation in order to update the protected data at a local persistent storage co-located with the user workstation.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
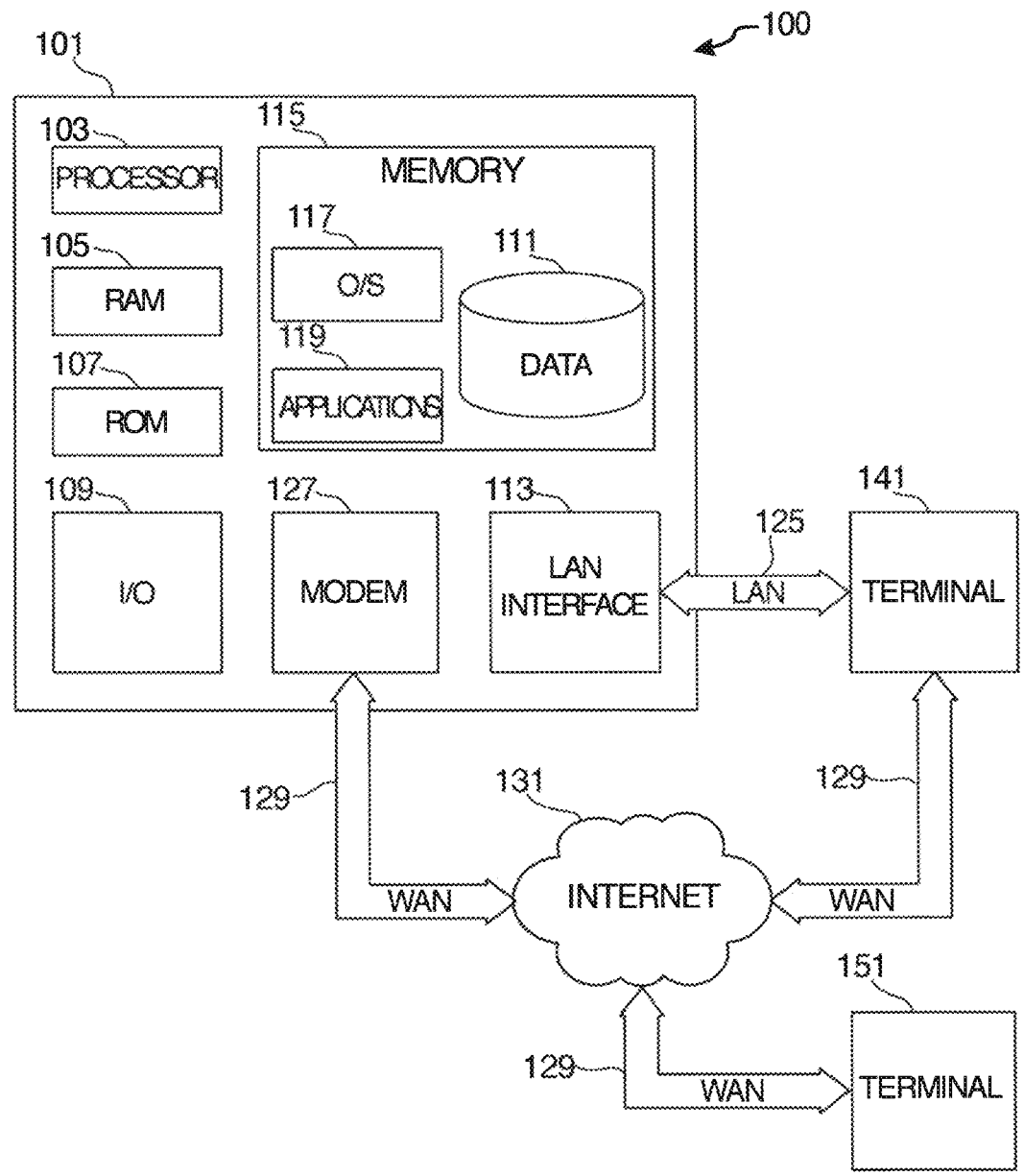
FIG. 1 shows an illustrative block diagram of system that may be configured in accordance with the principles of the disclosure.

Herein, methods and apparatus are described that preferably obtain the following properties and advantages associated therewith:

A first advantage may include persistent storage of a local computing device for a user u that preferably leaks no information from u's set of private and sensitive data d.

Certain embodiments may include providing a single session between an individual user u and a web service S that does potentially expose u's data d, by definition. However, in the event of a compromise of u's session with S, no other user's data is compromised whatsoever; in other words, the "blast radius" is limited to u.

A substantially unlimited number of concurrent sessions between u and S are able to use and modify d in such a manner that all copies of d eventually may become consistent.

The set of changes made to d over time may be, in certain embodiments, provably consistent and serializable. In other words, the current state of d is provably the result of a chain of individual changes, each of which resulted in a provably consistent and serializable intermediate state of d.

In embodiments according to the disclosure, preferably any attempt to attack d by an entity other than S—for example, malicious modification of keys or values in d—can be, in certain embodiments, instantly detected and rejected.

The user u may, in some embodiments, fully own and control its private and sensitive data d at all times, and may delete d permanently without involvement of the service S.

The full history of changes to d does not need to be, but can be in certain embodiments, stored.

One possible result derived from the foregoing is that preferably only the following trust relationships exist at a minimum:

The user u trusts the ephemeral instance of S during the duration of a session between u and S. For example, in certain embodiments, u may expend resources to use the service S and thus expects that any malicious activity by S with the user's data d would defeat the long-term viability of S's efforts.

And because of that, in certain embodiments S is highly incentivized and/or required to protect each instance of its service with all up-to-date best practices in hardware and software isolation, sandboxing, access control, development and deployment practices, and defense in depth.

The user u may, in certain embodiments, trust an intermediate service K (referred to herein, in the alternative, as a "companion service") to broker sessions and keys between S and u, as described herein. However, K preferably never has access to the user's data d.

The following exemplary terminology may be useful for understanding the disclosures set forth herein:

S—A service being provided to users. S is session oriented, which means there is a clear beginning of session and end of session. We identify the i'th (possibly concurrent) session of a user u with S as $S_i$.

u, U—One individual user of S is referred to as u. The set of all users of S is referred to as U.

d—The set of sensitive and private data for a given user u. The only requirement for an individual datum within d is that it be preferably identifiable by a unique key. This requirement is general; in certain embodiments, different kinds of data stores from simple key-value stores to full relational databases—and combinations thereof—are preferably compatible with the requirement and representable in d.

K—A companion service to S that manages the preparation of keys between u and S at the start of a new session.

The methods and apparatus according to the disclosures set forth herein obtains the aforementioned security properties and trust relationships by a combination of one or more of the following.

Each user u is allocated their own set of encrypted keys—possibly multiple keys for different data sets d. The user is preferably unable to decrypt their keys; the keys can preferably only be decrypted by the companion service K.

Each user u stores its own data set(s) d on its local computing device's persistent storage. The stored data sets are protected, meaning that they are encrypted and signed by u's keys. No user u can decrypt data sets on its local computing device.

When a user u initiates a new session with S, then the companion service K decrypts u's keys and securely transmits them to the new instance $S_i$ via a negotiated shared secret with preferably perfect forward secrecy—i.e., a preferably zero threat possibility going forward.

Each "version" of user data d is preferably uniquely identified by a cryptographically-secure authentication code. The authentication code is computed over the protected form of d, in other words from:

Cleartext (transmitted or stored text that has not been subjected to encryption and is not meant to be encrypted. As such, cleartext does not require decryption in order to be displayed. In its simplest form, cleartext is rendered as ASCII that can be read by any word processor or text editor) metadata, for example, the parent authentication code from the previous version of d;

Ciphertext (an algorithm applied to plain text obtains ciphertext. It is the unreadable output of an encryption algorithm. The term "cipher" is sometimes used as an alternative term for ciphertext. Ciphertext is not understandable until it has been converted into plain text using a key) metadata; and/or Ciphertext data compromising d (encrypted key-values).

Mutations of d are represented by "changesets," which may include:

The authentication code for the new version of d with mutations applied;

The authentication code for the previous version of d;

Other metadata; and/or

The mutations themselves, in encrypted form.

In some embodiments, when an $S_i$ wishes to "commit" a changeset on behalf of u, it preferably sends only the changeset metadata to K. The changeset metadata is preferably sufficient for K to determine whether the proposed changeset is consistent and serializable.

If so, the changeset is committed, otherwise it is rejected. By committing the authentication code for the previous version of d, the user data becomes similar to a blockchain to the extent that the user data, over time, involves multiple authentication codes.

Given a committed changeset, the user u can, in certain embodiments, efficiently update its persistent copy of d in-place using only the changeset metadata and mutation deltas. Preferably, the full new copy of d does not need to be transmitted.

Broadcasting the changeset to other instances $S_j$ allows them to verifiably reach eventual consistency.

The companion service K can commit other metadata from the representation of d and its associated metadata—i.e., metadata that are signed as part of d's authentication code—that allow the system to achieve various other properties. Potential uses include but are not limited to:

Sequence number: enables detecting whether changesets are received potentially out of order, vs. changesets that are invalid or have been tampered with;

Encryption counter: enables guaranteeing that the AES-GCM initialization vectors used to encrypt key-values in any committed changeset are unique (AES-GCM is a block cipher mode of operation that provides high speed of authenticated encryption and data integrity. In the current environment, the level of privacy protection is insufficient and the data can be compromised.);

Timestamp+modification time: enables $S_i$ to trust the timestamps computed for committed changesets, and enables detecting time drift between the changeset timestamps and the time they were committed by K.

Neither K nor $S_i$ nor u need to store the full history of committed changesets leading to the current version of d, although it is possible and within the scope of the current invention. In some embodiments, only the most recent version of d—and optionally a small buffer of changesets received out of order—may be maintained by $S_i$ and u.

One or more combinations of the foregoing features enable detecting and recovering invalid, lost, and out-of-order changesets, detecting and recovering from attacks on u and d, and/or detecting and recovering from other forms of data corruption and/or software defects.

A method for synchronizing private data with reduced trust is provided. The method may include initiating, at a user workstation, a new session of a web service. The method may transmit the initiation from the user workstation to a web service server. The initiation may trigger, at the web service server, an allocation of a session identifier to the new session and a preparation of a plurality of encryption keys and one or more tokens. The one or more tokens may be used to decrypt a changeset received at the workstation as per the steps below.

The method may also include receiving, at the user workstation, the session identifier and the one or more tokens. The workstation may be used to connect to a new session at the web service server. The workstation may also transmit, to the web service server, protected session data from the user workstation. The transmitting may occur during the new session. The protected session data may include a plurality of data changes.

The method may include receiving a changeset at the user workstation and updating the protected data at a local persistent storage co-located with the user workstation.

In certain embodiments, the web service server is configured to unprotect the protected data using the plurality of encryption keys, propose to commit the plurality of data changes as a new changeset and receive confirmation of a successful acceptance of the proposal to commit.

Following the receiving confirmation of a successful acceptance of the proposal to commit, the embodiments may further include receiving at the user workstation a broadcast of the successfully accepted plurality of data changes from the web service server.

The methods may also include using the broadcasting to update an unprotected copy of data in a future session.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system.

The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving Artificial Intelligence (AI) as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
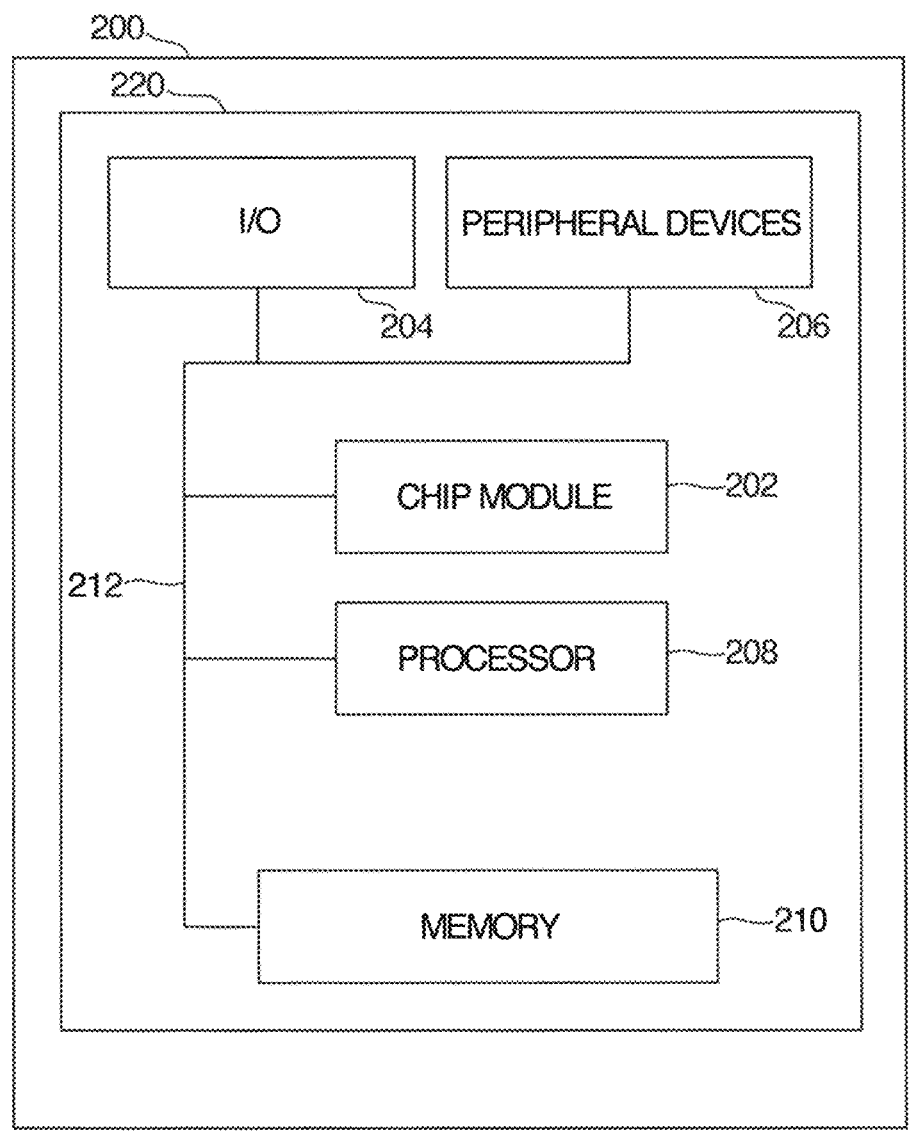
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
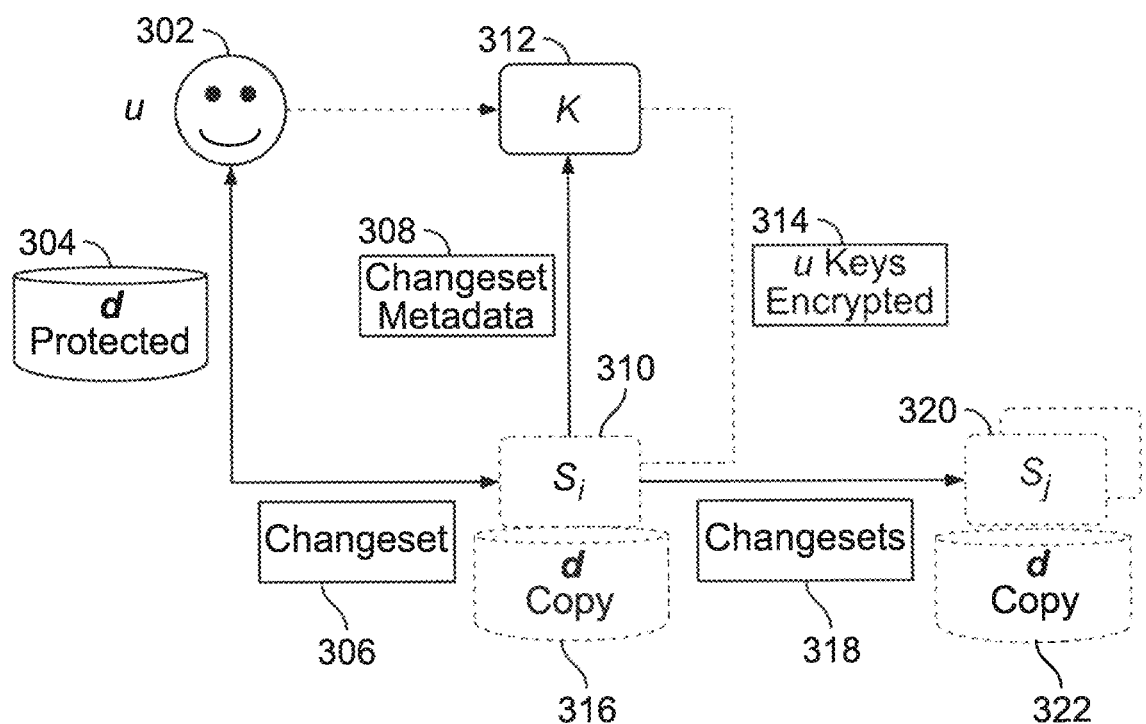
FIG. 3 shows a system overview in accordance with the principles of the disclosure.

FIG. 3 shows a system overview according to certain embodiments. Specifically, FIG. 3 shows a block diagram of the entities, and their interactions, within the system according to the invention.

The user u 302 stores data d 304 protected on the user's local computing device's persistent storage. "Protected," for the purposes of this application, refers to the fact that the data is encrypted and signed. In the embodiments and architectures set forth herein, u 302 cannot typically decrypt any data in d 304.

In some embodiments, u 302 requests that K 312 connect it to a new session with Si 310. K 312 preferably controls decrypting of u's 302 keys and wrapping data for transmission to Si 310. At no point does Si 310 ever have access to any "master keys" or similar keys used to encrypt and decrypt user keys.

In some embodiments, u 302 connects to Si 310 and transmits its protected data d 304. Si 310 uses u's 302 keys to verify and decrypt d 304 and prepare the data for handling further changes. The Si 310 and d-copies 316, 322 are shown with dotted borders to indicate that they are ephemeral—i.e., temporary—and only exist for the duration of the u 302's session S{u, i} 310.

When d 304 changes during the course of the session S{u, i} 310, then S{u, i} 310, attempts to "commit" the changeset representing the changes to K 312. Preferably only changeset metadata ever reaches K 312; user data d 304 and full changesets preferably never reach K 312.

Upon a successful commit, Si 310 preferably broadcasts the full changesets back to the user u 302 and any other Sj 310 for all u 302's other live sessions S{u, j} 320.

The user u 302 preferably cannot decrypt the full changeset, but u 302 can efficiently update its protected copy of d 304.

The other Sj 320 should preferably decrypt the full changeset and apply it to their cleartext copy of d.

Figure 4:
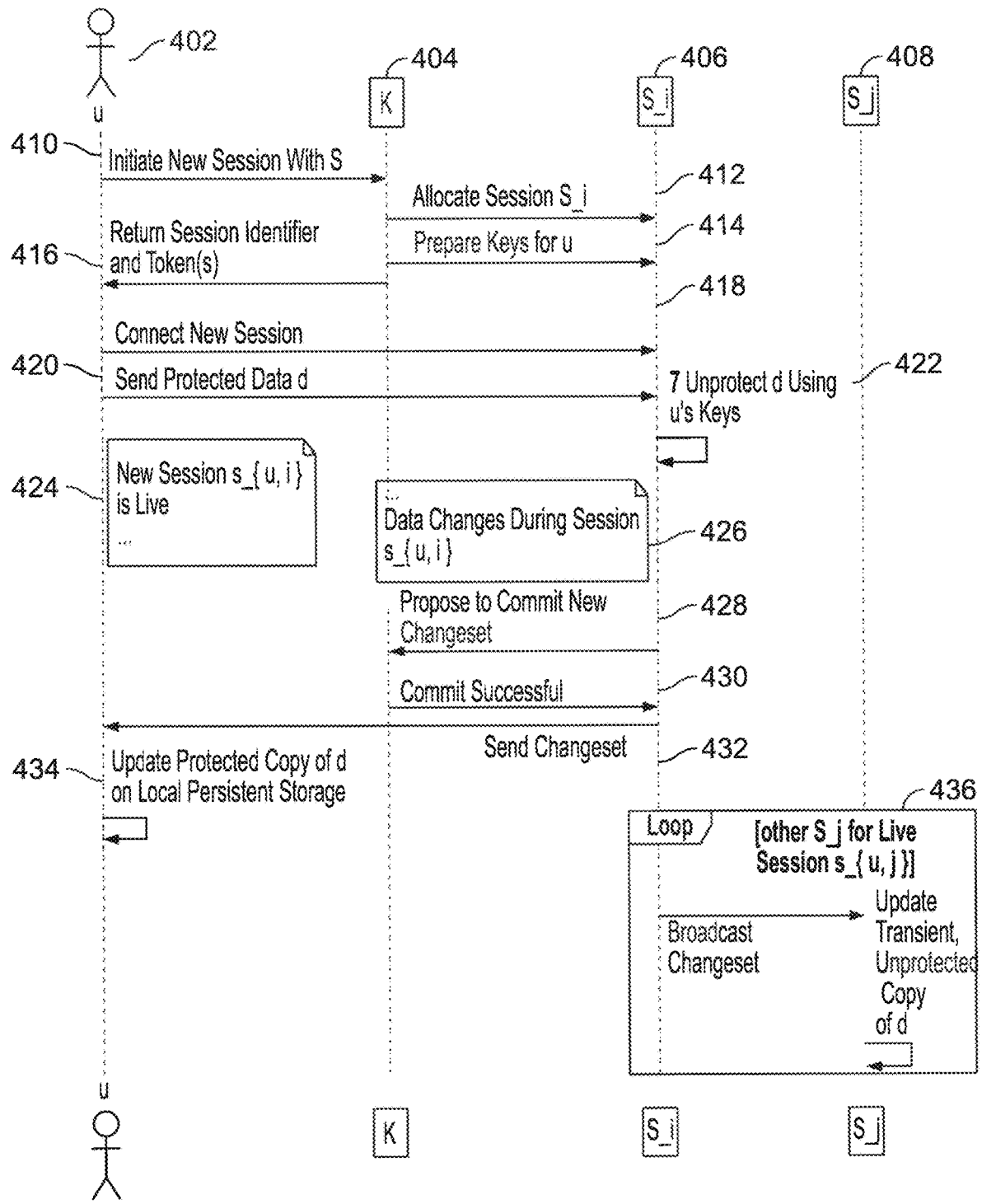
FIG. 4 shows a detailed rendition of an exemplary flow, according to the embodiments set forth herein.

The sequence diagram in FIG. 4 shows a more detailed rendition of an example flow, according to the embodiments set forth herein.

FIG. 4 shows a sequence diagram according to embodiments disclosed herein.

FIG. 4 includes a user 402, a companion service K 404, a first instance Si 406, and a second instance Sj 408.

At 410, user 402 requests to initiate a new session with a service (S) via the companion service K 404.

K 404 allocates an instance of Si 406 for user 402, as shown at 412.

K 404 and Si 406 cooperate to prepare the keys for user 402, as shown at 414. In certain embodiments, user 402's "keys" may include a signing key, an encryption key, and a secure random identifier for the private data d to be managed in sessions with S. In some embodiments, K 404 may encrypt user 402's keys on behalf of user 402, and rely on user 402 to persist the encrypted keys in user 402's local storage. In other embodiments, K 404 may encrypt user 402's keys and persist the encrypted keys on the server side. K 404 and Si 406 negotiate a shared secret key, in certain embodiments possibly via Diffie-Hellman key exchange, as is known in the art. K 404 may then re-encrypt user 402's keys using an encryption key derived from the shared secret and transmit the wrapped keys to Si 406.

K 404 returns information, such as the aforementioned identifier and/or token(s) for use with token-controlled public key encryption. Token-controlled public key encryption is a public key encryption scheme where individual messages can be encrypted and sent to every receiver, but the receiver cannot decrypt the message until he/she is given an extra piece of information called a "token." The information returned by K 404 enables user 402 to securely connect to Si 406 and continue initiating session Si 406, as shown at 416.

At 418, user 402 connects a new session to Si 406.

At 420, user 402 sends its protected—encrypted and signed—private data d to Si 406.

Using the keys previously negotiated with K 404, Si 406 is able to verify and decrypt the protected data d sent to it by user 402.

At this point, as shown at 424, the new session Si 406 is fully initialized and live. User 402 may have many other such concurrent sessions Sj 408 with instances Si 406.

Eventually, a session Si may change user 402's data d, as shown at 426. This starts the process of "committing" a "changeset" that includes changes to d and associated metadata, as shown at 428.

Si 406 computes a proposed changeset from the changes to d and user 402's keys. In certain embodiments, the changeset may consist of cleartext metadata, encrypted metadata, and the encrypted changes to d itself. To propose committing the new changeset, Si 406 submits to K the changeset metadata—but not the actual encrypted changes to d. If the proposed changeset's metadata is serializable with the previous "most recent commit," then K 404 atomically (either the operation succeeds, or the file is left unchanged) commits the new changeset's metadata and it becomes the most recent commit.

In certain embodiments, K 404 may use atomic database operations to atomically verify serializability and consistency, and commit the new changeset's metadata. K 404 commit ends successfully at 430 when K 404 sends the commit successful to Si 406.

In certain embodiments, changesets may be identified by an authenticated code, for example an HMAC of a full changeset including both metadata and changed data. Hash-based message authentication codes (or HMACs) are a tool for calculating message authentication codes using a cryptographic hash function coupled with a secret cryptographic key. As with any MAC, it may be used to simultaneously verify both the data integrity and authenticity of a message.

In certain embodiments, the authenticated codes for the changesets may be used to prove serializability. For example, part of the metadata authenticated by the code may include the previous current changeset's authentication code. Such embodiments employ a principle similar to "blockchain" authentication.

Other metadata required for encryption, eventual consistency, serializability, and fault recovery may also be authenticated and atomically updated by K 404. For example, certain embodiments may atomically update sequence numbers, timestamps, AES-GCM initialization vectors (AES-GCM is a block cipher mode of operation that provides high speed of authenticated encryption and data integrity), and other metadata along with changeset authentication codes.

If Si 406's changeset is successfully committed by K, then Si 406 begins the process of broadcasting the changeset as described below.

However, K may fail to commit a proposed changeset for many reasons. Different embodiments may choose to handle failed commits in different ways. These different ways may depend on the desired user-experience and security properties of the overall embodiment. Two examples are given below:

After the failed commit, Si 406 waits to apply pending updates from other Sj 408, as shown at the loop at 436, and, within loop 436, preferably recomputes a new changeset and re-attempts to commit the second proposed changeset (not shown).

After the failed commit, Si 406 "crashes" and waits for user 402 to re-initiate a new session if desired (not shown).

Si 406 sends the full, newly-committed changeset to user 402, as shown at 432. The newly-committed changeset includes both metadata and the actual encrypted changes to d.

The client app running on u's local computing device applies the changeset to local persistent storage, preferably in an ACID manner, as shown at 434. With respect to computers—ACID refers to atomicity, consistency, isolation, durability, which are a set of properties of database transactions intended to guarantee data validity despite errors, power failures, and other mishaps.

Loop 436 shows preferably shows Si 406 broadcasting a successfully-committed changeset to all other Sj 408. It should be noted that Si 406 preferably broadcasts the full, newly-committed changeset to all other sessions running as part of the user 402's sessions Sj 408. Each Sj 408 applies the changeset to its local, transient copy of d using user 402's keys.

After this point, changes to d have preferably been (i) successfully committed by K; (ii) applied to user 402's persistent local storage in protected (encrypted and signed) form with ACID semantics; and/or (iii) applied to all other Sj 408 local transient copies. The system has reached eventual consistency.

Detecting Invalid, Lost, and Out-of-Order Changesets

An embodiment of a distributed system of services across networks will in general have certain sources of instability and unreliability. For example, a service may become unavailable due to a "crash" or malfunctioning hardware, or a network may become partitioned and lose messages between certain endpoints. A method and apparatus to ensure eventual consistency and serializability of a user's private and sensitive data d preferably contemplates, detects, and provides mechanisms for resilience in the face of potential instability and unreliability.

Certain embodiments set forth herein may include metadata in the user data d. By having K atomically commit the metadata as part of the commit of a changeset, then the metadata becomes authenticated by the authentication code of a given version of d. The authenticated metadata may then be verified and trusted with respect to the trust relationships between parties in the system.

Some exemplary metadata and potential uses are listed below, but it should be noted that the scope of the current disclosure is not limited to the following examples.

Sequence Number

When an Si commits a changeset and broadcasts the changeset to a user and Sj, the changeset might be lost or arrive out of order. Including an authenticated sequence number in the metadata of d and its changesets allows a user and Sj to easily detect out-of-order changesets and take various actions.

Certain embodiments may choose to queue up pending changesets until an expected, missing sequence number arrives, and "time out" if the missing changeset is not received within a certain duration of time. After timing out, various embodiments may choose application-specific recovery logic. For example, certain embodiments may choose to "roll back" the user's data d to a prior complete version. Other embodiments may choose to invalidate the user's data entirely.

Counter

Certain embodiments may use a cryptosystem like AES-GCM to protect the data in d. If a provably unique initialization vector or similar kind of nonce is required by the cryptosystem, then it can be committed, authenticated, and verified along with the other data and metadata in d. For an embodiment that uses the AES-GCM algorithm, the counter may monotonically increase with each encryption operation performed during the computation of a new changeset. By authenticating and committing the counter as part of the changeset, it becomes possible for companion service K and Sj to verify the signature including the counter, and also verify that it increases monotonically with the new changeset.

Timestamp

In certain embodiments, a tension exists between:

Strictly validating the protected data d passed by a user to an Si, to prevent any potential malicious activity; and Accepting protected data d that might be out-of-date in some way, to ensure that the session s {u, i} can make use of as much data from d as possible, even if out of date.

For example, a user u's data d might include public keys for peers of u in a messaging app. If one of u's peers p is compromised and its key is rotated, then an older version of d might include the invalidated key for p. This may potentially leave the user u vulnerable to an attack in which p's identity is spuriously authenticated by using an out-of-date public key in outdated d—i.e., an attacker could impersonate p in a message sent to u.

Such considerations and tradeoffs therein are specific to particular embodiments. By including timestamp metadata in data d, then different embodiments may implement a range of policies. Consider the following example.

User u finishes all sessions with Si. K and u are consistent in believing that the most recent version of d is identified by authentication code c.

User u's local computing device suffers a catastrophic failure of persistent storage. The local computing device must be restored from a backup that is N days old.

The next time u initiates a session with Si, then K still records the latest version of d as having code c. However, the older copy of d that was restored to u's persistent storage will have outdated code c'. But, c' still represents a consistent and verifiably serializable older version of d.

During initialization, Si will receive from K the user u's keys and expected metadata for the most recent version of d.

When u transmits its protected copy of d to Si, Si detects that d is out of date. By comparing the timestamp included in d (authenticated by c') against the expected timestamp from K, then Si can compute that c' is a certain number of seconds out of date.

At this point Si can apply a range of policies. In certain embodiments, the policy could be:

If c' is more than X seconds out of date, reject d.

Otherwise, accept d and force K to "roll back" to d's version represented by authentication code c'. The rollback may occur by Si committing a special "rollback changeset" to K.

FIG. 5-8 show multiple browser instances for presenting, and overcoming, certain obstacles that occur with embodiments according to the disclosure set forth herein.

Multiple browser instances typically cannot share the same on-disk profile. This is true even on the same (virtual) machine.

Figure 5:
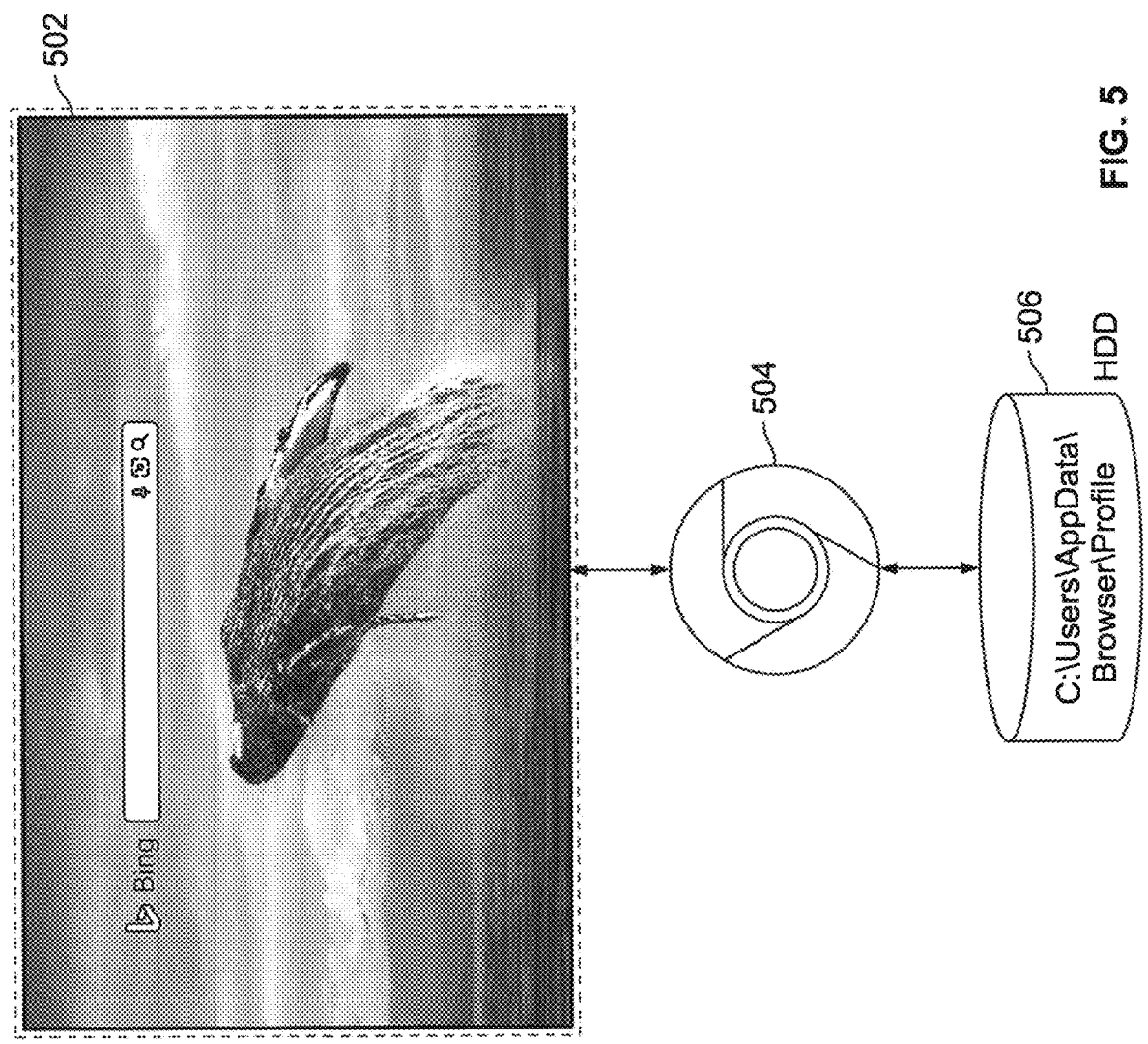
FIG. 5-8 show multiple browser instances that present, and overcome, certain according to the disclosure set forth herein.

FIG. 5 shows a single browser instance 504. Display 502 is preferably instantiated in connection with the browser instance 504. In order to operate, browser instance 504 preferably presents a tab as display 502 and has a single on-disk profile 506.

Figure 6:
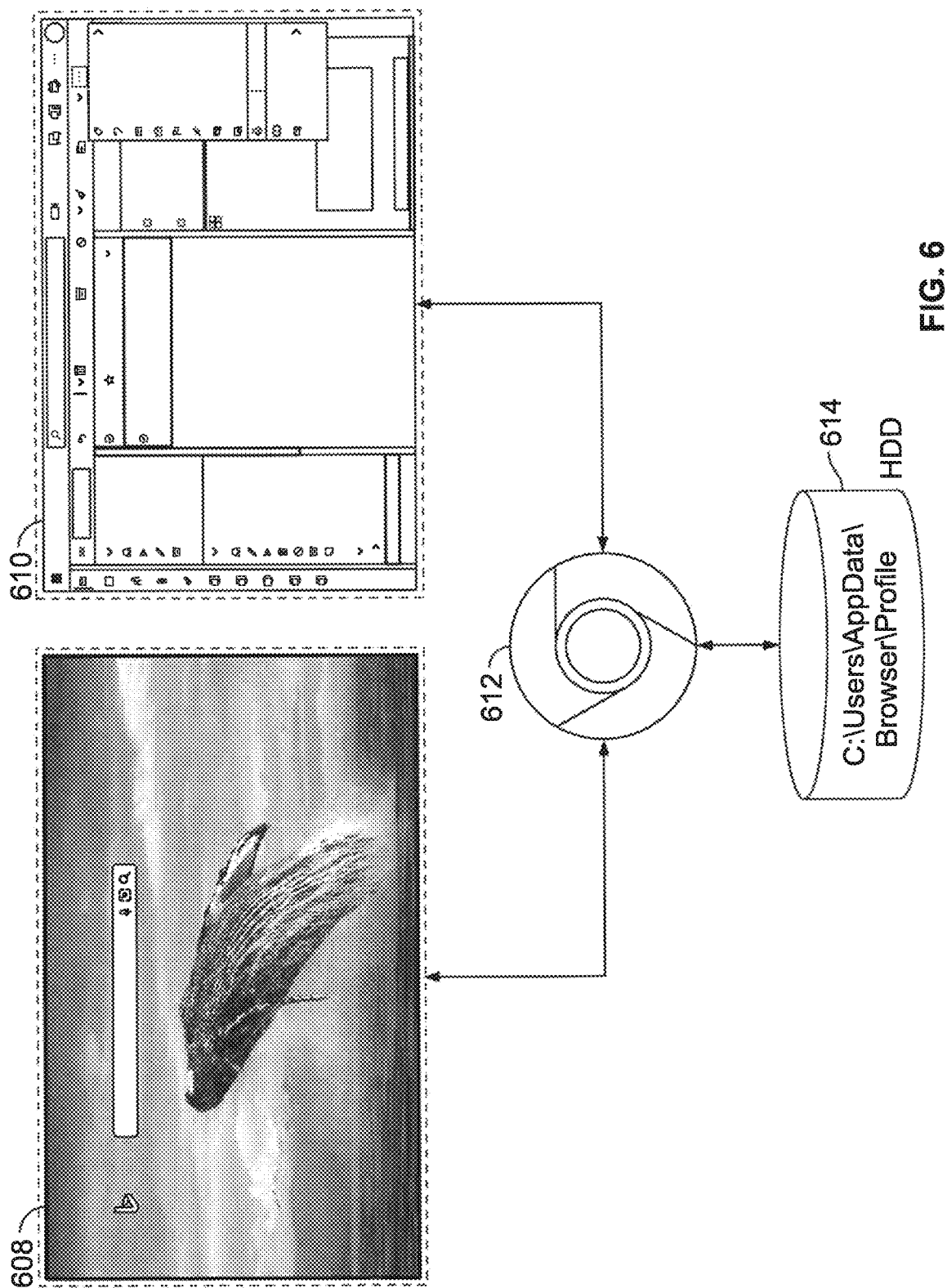

FIG. 6 shows a second browser instance 612 with a single on-disk profile 614. Browser instance 612 preferably includes two tabs 608, 610.

Figure 7:
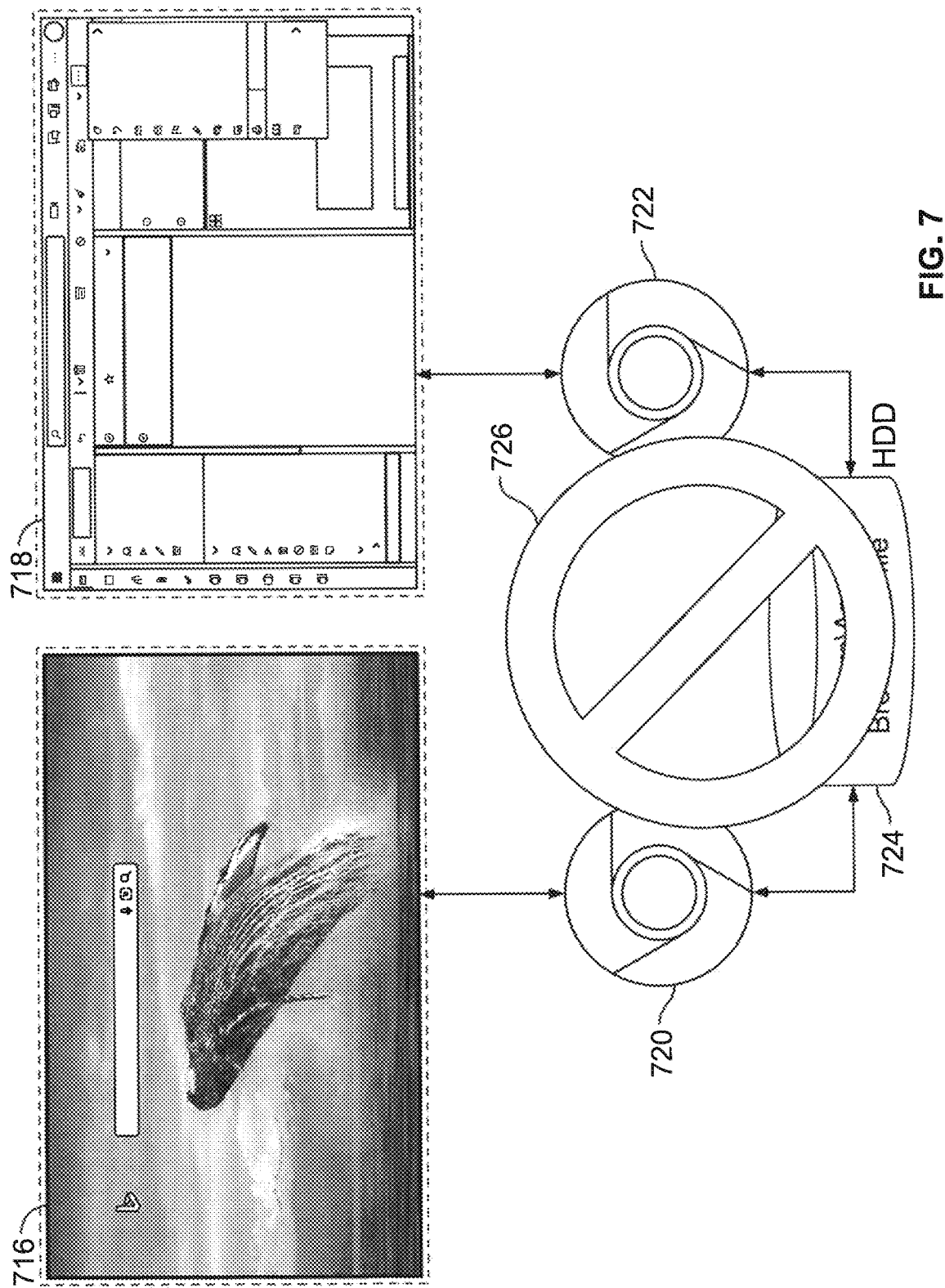

FIG. 7, also shows, schematically, two browser instances 720 and 722 with one tab 716 and 718, per instance. Such an architecture is currently disallowed 726, for the reasons that follow, when a single on-disk profile 724 is used to support same.

If current browsers did support multiple independent browser instances concurrently using the same on-disk profile for a mode of operation, changes to the user's profile would need to be encrypted and synchronized back to the user's local machine in the trust model that the embodiments of this disclosure aim to achieve. Further, modes of operation that involve multiple independent browser instances concurrently using the same on-disk profile present large amount of implementation complexity and required performance overhead, and provide zero benefit to the vast majority of users.

Figure 8:
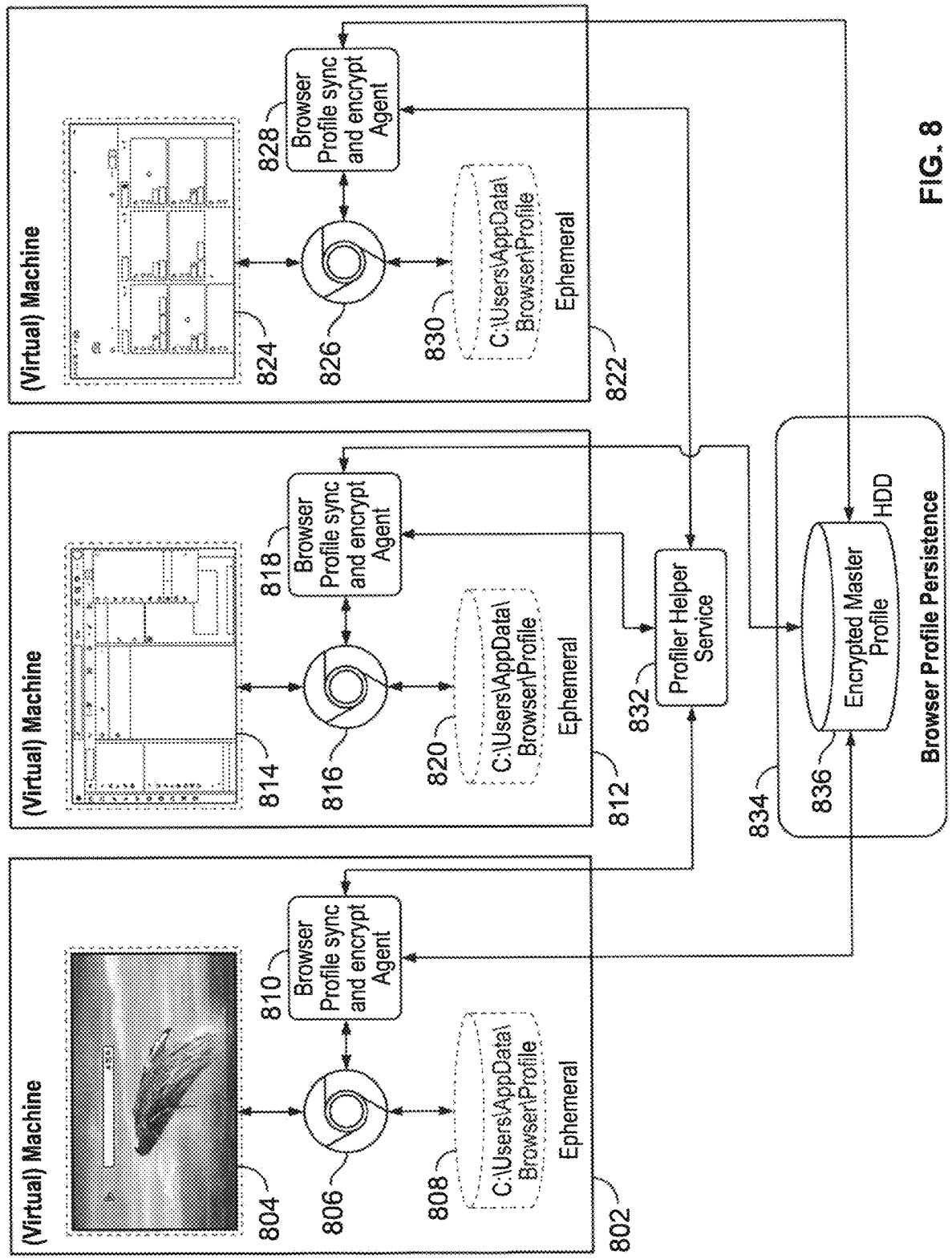

FIG. 8 shows a solution to the issue presented above that conventional architecture disallows supporting multiple browser instances with a single on-disk profile. FIG. 8 shows synchronizing and encrypting a profile at a higher level, across even multiple ephemeral virtual machines. Such synchronizing and encrypting a profile at a higher level preferably enables systems and methods according to the disclosure to provide an architecture that supports multiple browser instances with a single on-disk profile.

FIG. 8 shows a single browser instance 806 on a virtual machine 802. Display 804 is preferably instantiated in connection with the browser instance 806. Browser instance 806 preferably presents a tab — not shown—and has a single on-disk profile 808. Browser instance 806 is also preferably in electronic communication with browser profile synchronization and encryption agent 810.

Each of additional virtual machines 812 and 822 have the same nominal architecture as virtual machine 802. For example, each of additional virtual machines 812 and 822 include a single browser instance 816, 826, a single display 814, 824, a single on-disk profile 820, 830 and a single browser profile synchronization and encryption agent 818, 828.

A profile helper service 832 also serves to coordinate operation of the browser profile synchronization and encryption agents 808, 818 and 828. In addition, each of the browser profile synchronization and encryption agents 810, 818 and 828 are coupled, preferably in electronic communication, with an encrypted master profile 836 which is resident in a browser profile persistence engine 834.

The system preferably works as follows: each of the three browser instances 806, 816, 826 includes one tab per instance. Each of the browser profile synchronization and encryption agents 810, 818 and 828 synchronizes and encrypts profile changes with the master copy (as shown as the encrypted master profile 836) via profile helper service 832. In some embodiments, encrypted master profile 836 may be a cloud service or a user's local machine.

Exemplary code listings are included in Appendix A. There are two code listings set forth therein. The first involves the logic from the embodiment of the user agent in a system according to the current disclosure. The second is logic from the service in a system according to the current disclosure.

Thus, systems and methods for SYNCHRONIZING PRIVATE DATA WITH REDUCED TRUST are provided. Persons skilled in the art will appreciate that the present invention can be practiced by other than the described embodiments, which are presented for purposes of illustration rather than of limitation. The present invention is limited only by the claims that follow.

What is claimed is:

1. A method for synchronizing private data with reduced trust, the method for use with a system, the system comprising a processor and a non-transitory memory with instructions stored thereon, wherein the instructions upon execution by the processor, cause the processor to execute the method, said method comprising:
   receiving an initiation, from a user workstation, of a new session at a web service server, wherein the new session comprises an ephemeral web browser instance that is one of a set of ephemeral web browser instances;
   storing a sensitive data set in a local persistent storage co-located with the user workstation;
   allocating a session identifier to the new session;
   connecting to an intermediate web service;
   preparing, at the intermediate web service, a plurality of encryption keys and one or more tokens for a user, wherein:
      the plurality of encryption keys are encrypted; and
      the user workspace is unable to decrypt the encrypted encryption keys;
   returning the session identifier and the one or more tokens to the user workstation;
   connecting the user workstation to the new session;
   receiving, at the web service server, protected data from the user workstation, said receiving occurring during the new session, said protected data comprising the sensitive data set and a plurality of data changes to the sensitive data set;
   securely transmitting, from the intermediate web service to the web service server, the plurality of encryption keys;
   unprotecting, at the web service server, the protected data using the plurality of encryption keys;
   proposing to commit the plurality of data changes as a new changeset wherein said proposing comprises transmitting metadata describing the changeset, without transmitting the changeset, from the web service server to the intermediate web service;
   receiving confirmation, from the intermediate web service, of a successful acceptance of the proposal to commit; and
   transmitting the changeset to the user workstation in order to update the protected data at the local persistent storage co-located with the user workstation wherein:
   the intermediate web service is prevented from accessing the sensitive data set
   the sensitive data set is securely encrypted; and
   the user workspace is unable to decrypt the sensitive data set.

2. The method of claim 1, following the receiving confirmation of the successful acceptance of the proposal to commit, further comprising broadcasting the plurality of data changes.

3. The method of claim 2 further comprising using the broadcasting to update an unprotected copy of the data for use in a future session.

4. The method of claim 1 further comprising instructing the workstation to use the one or more tokens to decrypt the changeset.

5. The method of claim 1 wherein the intermediate web service has the exclusive ability to decrypt the encrypted encryption keys.

6. A method for synchronizing private data with reduced trust, the method for use with a system, the system comprising a processor and a non-transitory memory with instructions stored thereon, wherein the instructions upon execution by the processor, cause the processor to execute the method, said method comprising:
   initiating, at a user workstation, a new session of a web service, wherein the new session comprises an ephemeral web browser instance that is one of a set of ephemeral web browser instances;
   storing a sensitive data set in a local persistent storage co-located with the user workstation;
   transmitting the initiation to a web service server, said initiation triggering, at the web service server, an allocation of a session identifier to the new session and a preparation of one or more tokens;
   connecting to an intermediate web service;
   preparing, at the intermediate web service, a plurality of encryption keys wherein:
      the plurality of encryption keys are encrypted; and
      the user workspace is unable to decrypt the encrypted encryption keys;
   receiving, at the user workstation, the session identifier and the one or more tokens;
   using the user workstation to connect to the new session at the web service server;
   transmitting, to the web service server, protected session data from the user workstation, said transmitting occurring during the new session, said protected session data comprising the sensitive data set and a plurality of data changes;

securely transmitting, from the intermediate web service to the web service server, the plurality of encryption keys;

unprotecting, at the web service server, the protected session data using the plurality of encryption keys;

proposing to commit the plurality of data changes as a new changeset, wherein said proposing comprises transmitting metadata describing the changeset, without transmitting the changeset, from the web service server to the intermediate web service;

receiving confirmation, from the intermediate web service, of a successful acceptance of the proposal to commit receiving the changeset at the user workstation;

using the one or more tokens at the workstation to decrypt the protected session data; and updating the protected data at the local persistent storage co-located with the user workstation wherein:

the intermediate web service is prevented from accessing the sensitive data set the sensitive data set is securely encrypted; and the user workspace is unable to decrypt the sensitive data set.

7. The method of claim 6, following the receiving confirmation of the successful acceptance of the proposal to commit, further comprising receiving at the user workstation a broadcast of the successfully accepted plurality of data changes from the web service server.

8. The method of claim 7 further comprising using the broadcasting to update an unprotected copy of the data in a future session.

9. The method of claim 6 wherein the intermediate web service has the exclusive ability to decrypt the encrypted encryption keys.

10. A system for synchronizing private data with reduced trust, the system comprising a processor and a non-transitory memory with instructions stored thereon, wherein the instructions, upon execution by the processor, cause the processor to:

receive an initiation, from a user workstation, of a new session at a web service server, wherein the new session comprises an ephemeral web browser instance that is one of a set of ephemeral web browser instances;

connect to an intermediate web service;

prepare, at the intermediate web service, an encryption key, wherein:

the encryption key is encrypted; and the user workspace is unable to decrypt the encrypted encryption key;

store a sensitive data set in a local persistent storage co-located with the user workstation, wherein:

the sensitive data set is encrypted;

the user workspace is unable to decrypt the sensitive data set and the intermediate web service is prevented from accessing the sensitive data set;

allocate a session identifier to the new session;

return the session identifier to the user workstation;

connect the user workstation to the new session;

receive at the web service server, from the user workstation during the new session, the sensitive data set and a plurality of data changes to the sensitive data set;

securely transmit, from the intermediate web service to the web service server, the encryption key;

decrypt, at the web service server, the sensitive data set using the encryption key;

propose to commit the plurality of data changes as a new changeset, wherein said proposing comprises transmitting metadata describing the changeset, without transmitting the changeset, from the web service server to the intermediate web service;

receive confirmation, from the intermediate web service, of a successful acceptance of the proposal to commit; and transmit the changeset to the user workstation.

11. The system of claim 10 wherein the intermediate web service has the exclusive ability to decrypt the encrypted encryption key.

12. A method for synchronizing private data with reduced trust, the method for use with a system, the system comprising a processor and a non-transitory memory with instructions stored thereon, wherein the instructions, upon execution by the processor, cause the processor to execute the method, said method comprising:

receiving a request, at an intermediate web service, from a user workstation to initiate a new session with a web service;

allocating, via the intermediate web service, an instance of the web service for the new session, wherein the instance comprises an ephemeral web browser instance that is one of a set of ephemeral web browser instances;

generating, at the intermediate web service, a set of cryptographic keys;

encrypting the set of cryptographic keys at the intermediate web service, wherein the user workspace is unable to decrypt the encrypted set of cryptographic keys;

transmitting the encrypted set of cryptographic keys from the intermediate web service to the user workstation;

storing the encrypted set of cryptographic keys in persistent local storage at the user workstation;

negotiating, between the intermediate web service and the instance of the web service, a shared secret key;

generating, at the intermediate web service, session initialization information;

transmitting the session initialization information from the intermediate web service to the user workstation;

using the session initialization information, connecting the user workstation to the instance of the web service for the new session;

storing a sensitive data set at the user workstation, wherein the sensitive data set is encrypted;

receiving, at the instance of the web service as part of the new session, a copy of the sensitive data set and the encrypted set of cryptographic keys;

decrypting the encrypted set of cryptographic keys, at the instance of the web service, using the shared secret key;

decrypting the copy of the sensitive data, at the instance of the web service, using the decrypted set of cryptographic keys; and using the decrypted copy of the sensitive data, at the instance of the web service, for the new session;

wherein the method further comprises:

detecting, at the instance of the web service, a change to the copy of the sensitive data;

proposing to commit the change as a changeset, wherein said proposing comprises transmitting metadata describing the change, without transmitting the change, to the intermediate web service;

receiving, at the instance of the web service from the intermediate web service, authorization to commit the change as a changeset and broadcasting the changeset to the user workstation; and wherein:

the intermediate web service is prevented from accessing the sensitive data set the sensitive data set is securely encrypted; and the user workspace is unable to decrypt the sensitive data set.

13. The method of claim 12 wherein the instance of the web service is a first instance of a plurality of instances, and the method further comprises broadcasting the changeset to the other instances.

14. The method of claim 12 wherein the set of keys includes a signing key, an encryption key, and a secure random identifier.

15. The method of claim 12 wherein the copy of the sensitive data set and the instance of the web service allocated for the new session persist exclusively for the duration of the new session.

* * * * *